United States Patent [19]

Puech et al.

[11] 4,038,524
[45] July 26, 1977

[54] DATA CARRIER OPTICALLY READABLE BY TRANSMISSION AND METHOD OF MANUFACTURING SUCH A DATA CARRIER

[75] Inventors: Claude Puech; Claude Bricot; Bernard Carre; Jean Claude Dubois; Francois Le Carvennec; Jean Claude Lehureau, all of Paris, France

[73] Assignee: Thomson-Brandt, Paris, France

[21] Appl. No.: 588,158

[22] Filed: June 17, 1975

[30] Foreign Application Priority Data

June 21, 1974 France .................................. 74.21662

[51] Int. Cl.² ...................... G11B 19/02; B32B 31/00; G11B 7/14; G11C 11/44
[52] U.S. Cl. ............................. 235/61.12 N; 156/300; 179/100.3 N; 235/61.11 E; 340/173 LT
[58] Field of Search .................. 340/173 LS, 173 LT, 340/173 LM; 235/61.11 E, 61.11 D, 61.12 R, 61.12 N, 61.12 M, 61.7 B, 61.6 R; 360/2, 133, 135; 250/568, 569, 570; 40/2.2; 179/100 BV, 100.4 R; 178/6.6 R, 6.6 DD; 156/300

[56] References Cited

U.S. PATENT DOCUMENTS

| 3,313,052 | 4/1967 | Malster | 40/2.2 |
|---|---|---|---|
| 3,430,966 | 3/1969 | Gregg | 179/100.3 V |
| 3,536,894 | 10/1970 | Travioli | 235/61.6 R |
| 3,586,593 | 1/1971 | Dahl | 235/61.12 M |
| 3,786,238 | 1/1974 | Heisner | 235/61.11 E |
| 3,829,662 | 8/1974 | Furahashi | 235/61.12 R |
| 3,846,843 | 11/1974 | Franer | 360/135 |
| 3,913,076 | 10/1975 | Lehureau | 340/173 LT |

Primary Examiner—Robert M. Kilgore
Attorney, Agent, or Firm—Cushman, Darby & Cushman

[57] ABSTRACT

The present invention relates to the protecting against scratching and fouling of a data carrier which carries a relief impression readable optically by transmission. The data carrier in accordance with the invention is protected by a transparent protective layer with substantially smooth faces, which adheres to the peaks in the relief of the impression in such a way as to prevent the troughs in said relief from being filled up.

21 Claims, 9 Drawing Figures

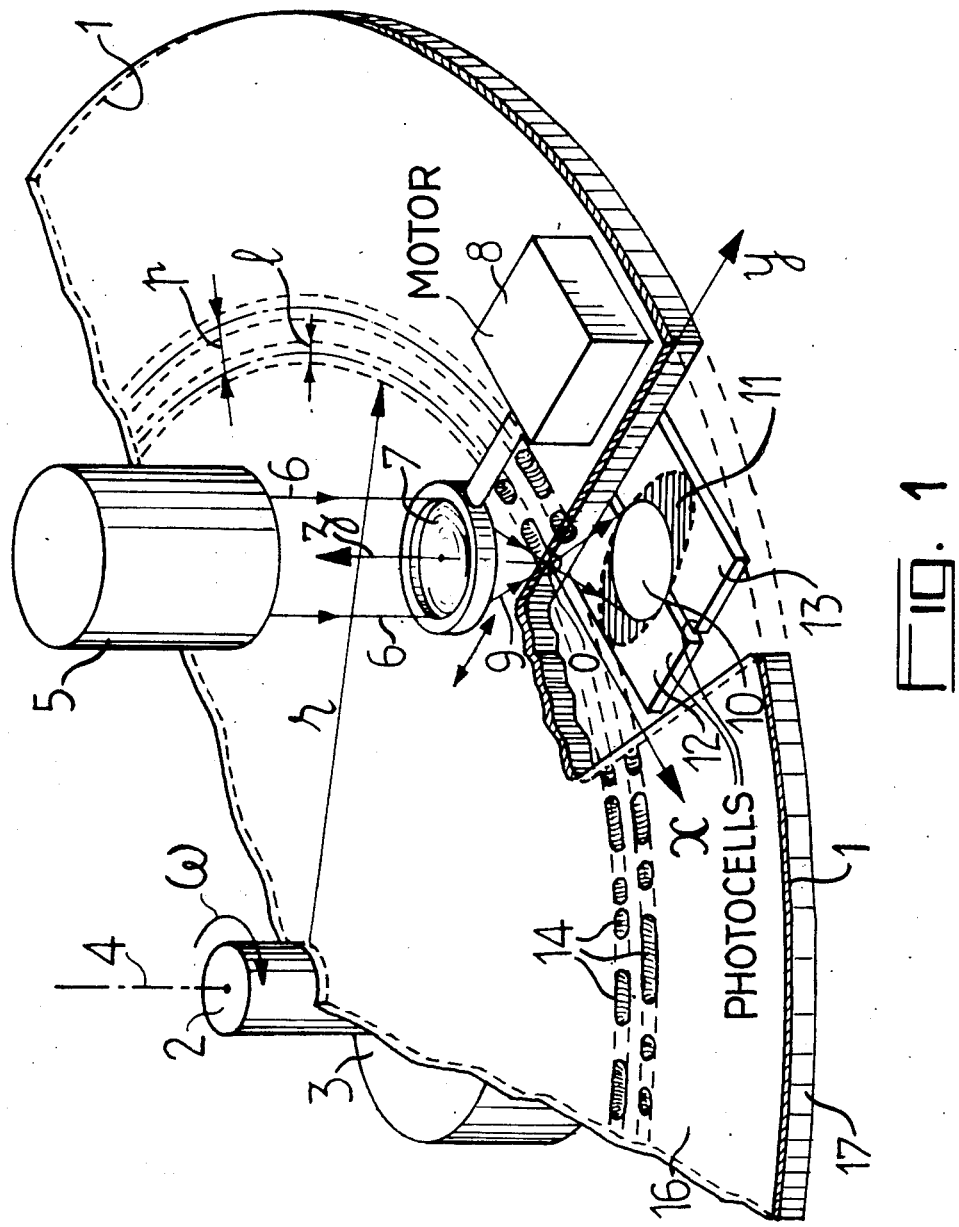

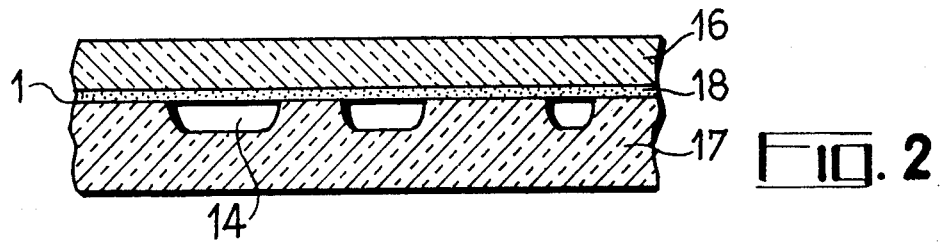
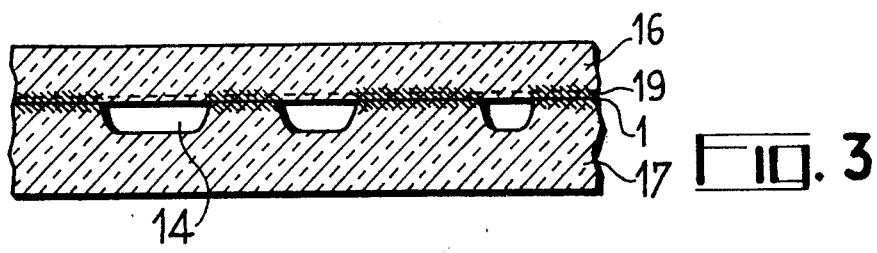
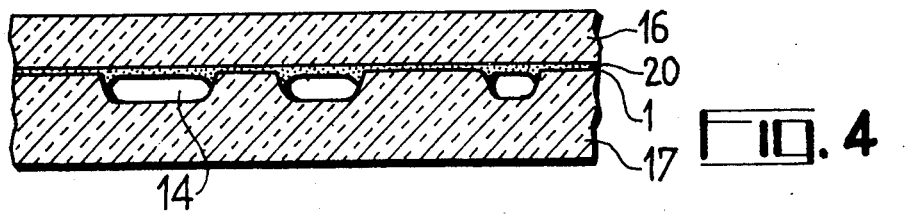
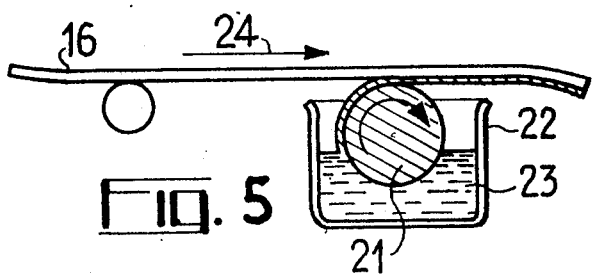
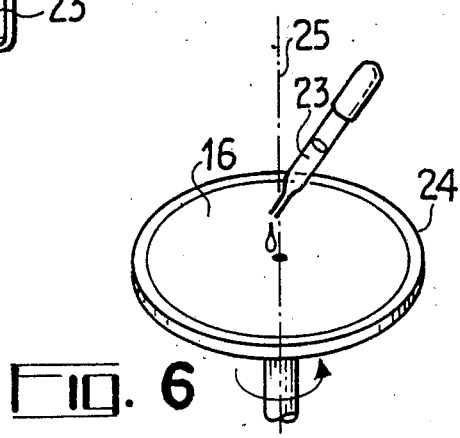

DATA CARRIER OPTICALLY READABLE BY TRANSMISSION AND METHOD OF MANUFACTURING SUCH A DATA CARRIER

The present invention relates to data carriers which can be read out by transmission using a concentrated optical radiation. These data carriers generally comprise a flexible or rigid sheet of a material transparent vis-a-vis the optical read-out radiation and capable of carrying on at least one of its faces the permanent impression of a track of substantially constant width. The track is made up of a succession of diffractive elements formed by alternating peaks and troughs. When the data carrier is illuminated by a quasi-punctiform read-out spot moving along the track axis, at the time at which the spot passes over the diffractive elements a greater or lesser degree of spread in the optical read-out radiation is observed. This kind of design is appropriate to the transcription of information by the angular modulation of a carrier wave. The optical radiation transmitted by the data carrier is picked off selectively by photo-electric transducers which furnish electrical read-out signals carrying the stored information. The material used to manufacture the data carrier is vulnerable to scratching and the very fine impression formed at its surface risks suffering severe deterioration as a consequence of scoring and fouling stemming from careless handling of the carrier.

To avoid deterioration of the stored information, it is necessary to protect the impression by removing it from the influence of external agents such as finger prints, scratches and dust.

The protecting of a data carrier designed to be read out by reflection of optical radiation has been achieved by covering the impression with an opaque metal coating. A metal coating, however, will not be acceptable in the situation where the data carrier is to be read out by transmission, since the element protecting the impression must necessarily be transparent vis-a-vis the optical read-out radiation.

It is also known to protect a data carrier which is readable by transmission, by covering the pressed or moulded impression with a refractive layer following the relief of the impression at the surface of mutual contact, but having a substantially smooth free surface which may be scratched or fouled without interfering with information read-out.

It is also possible to place above the impression a protective layer which is transparent vis-a-vis the read-out radiation and which, although detached, applies itself against the peaks of the relief impression in order to avoid the need to fill the hollows with a refractive medium whose refractive index differs slightly from that of the data carrier proper. This latter method of protection makes it possible to maintain the diffracting effect of the bare impression despite the fact that it is associated with a protective layer. However, since this layer is separate from the impression itself, fouling and scratching could still damage the impression under clumsy handling.

In order to provide the kind of protection which is entirely effective whilst at the same time achieving a substantial diffracting effect, the present invention proposes that the relief impression of a data carrier which is readable by transmission, should be protected by means of a protective layer which does not adhere to the impression except at the peaks of the relief. Adhesion can be achieved by sticking, by welding or by the insertion of a self-adhesive under-layer.

In accordance with a first object of the present invention there is provided a data carrier optically readable by transmission using an optical radiation, said data carrier comprising: a sheet of material transmitting said radiation; said sheet having at least one face carrying a permanent relief impression; said relief impression being in the form of a track; said track being made up of a succession of diffractive elements formed by alternating peaks and troughs constituting the transcription of a carrier wave angularly modulated by said data; said data carrier further comprising at least one protective layer transmitting said radiation; said protection layer having smooth faces and adhering by one of said smooth faces to said peaks without filling up said troughs.

A further object of the invention is a method of manufacturing the above mentioned data carrier.

For a better understanding of the present invention and to show how the same may be carried into effect reference will be made to the ensuing description and to the attached figures among which:

FIG. 1 is a partial isometric view of a data carrier protected in accordance with the invention, and of the essential elements required for its read-out by transmission.

FIG. 2 is a section through the data carrier illustrating a first embodiment of the invention.

FIG. 3 is a section through the data carrier illustrating a second embodiment of the invention.

FIG. 4 is a section through the data carrier illustrating a third embodiment of the invention.

FIGS. 5 and 6 illustrate means for carrying out a liquid-phase coating operation, designed to implement the method of manufacture in accordance with the invention.

Figure 7:
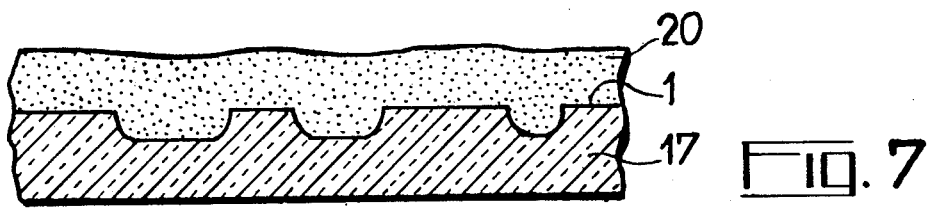
FIGS. 7 to 9 show three manufacturing steps of a further embodiment of the data carrier.

In FIG. 1, by way of non-limitative example, there has been illustrated a fragment of a data carrier 17, of flexible or rigid design, in the form of a disc and equipped at its top face 1 with a transparent protective layer 16 also flexible or rigid. Through the layer 16 it will be observed that the face 1 of the disc 17 has been provided with the relief impression of a succession of diffractive elements 14 arranged in the form of track sections shown in broken line. These track sections, in FIG. 1, are represented by two successive turns of a spiral track of width 1 and pitch $p$, but they can equally well correspond with circular, concentric elementary tracks. The diffractive elements 14 shown in FIG. 1 are constituted by minute impressions which open out in the plane $xy$ of the face 1 of the data carrier 17. In this case, the bases of the depressions correspond to the troughs of the impression and the plane $xy$ contains the peaks of the impression, and it is against these latter peaks that the protective layer 16 rests. Without departing from the scope of the invention, it is equally possible to consider the reverse case in which the diffractive elements 14 are constituted by elevations against the tops of which the protective layer 16 rests. In either case, the impression can be produced either by pressing or moulding and the data carrier 17 can advantageously be constituted by a sheet of polyvinylchloride, a material which lends itself well to the production of the impression.

In FIG. 1, the mechanical drive system and the system for the optical read-out by transmission, of the disc 16-17, have been shown. The mechanical drive is produced by a centring pin 2 imparted a rotation ω about the axis 4 by a motor 3. The engraved track located at the distance r from the axis 4 thus passes opposite the read-out point 0 on to which the lens 7 projects a spot of concentrated radiant energy. The radiant energy stems from a source 5 and the beam 6 emerging therefrom is focussed at 0 in the plane XY of read-out, this corresponding substantially to the interface between the data carrier 17 and the protective layer 16. The convergent beam 9 which illuminates the track is able to follow the latter by virtue of a radial displacement performed by the optical system 5, under the control of a motor 8. The read-out radiation having passed through the protective layer 16 and the data carrier 17, is picked up by photoelectric transducers 12 and 13. In the absence of any diffractive element 14 in the path of the read-out beam 9, the transducers 12 and 13 receive zero-order illumination in the non cross-hatched circular zone 10. In the presence of a diffractive element, the illumination scatters in accordance with the cross-hatched zones 11 and the result is that by combining the voltages delivered by the transducers, a read-out signal is obtained. This signal generally takes the form of a squarewave angularly modulated by the information stored along the track. It goes without saying that the opening formed in the disc does not really exist and is simply shown in order to more clearly illustrate the structure and the method of read-out. It is also useful to point out that the disc solution is only an example and it is possible to conceive of a tape-type data carrier moving in straight line fashion. Finally, it should be pointed out that the protective layer may be arranged to cover only the engraved areas of the disc.

In accordance with the invention, the protective layer 16 adheres to the impression formed in the data carrier 17, through the peaks in the relief thereof, in order to protect the impression against the kind of deterioration which it could undergo if the protective layer were not provided or if it did not adhere to the impression. Manipulation of the protective disc may produce scratching and/or fouling of the free face of the protective layer 16 but, since the thickness of the layer 16 is substantially greater than the width l and the depth p of the diffractive elements, there is no problem as far as read-out is concerned. In other words the read-out spot being concentrated on the track by a lens of large aperture, the zone occupied on the free face of the protective layer by the illumination produced by the read-out radiation, has a diameter quite large enough to ensure that scratches and fouling have no perceptible effect upon the form of the read-out signal.

We have seen that the diffractive elements 14 produce a diffracting effect upon the read-out beam 9. The magnitude of this diffracting effect is large if the impression is in contact with the air since the refractive index of this medium is equal to unity and differs substantially from the refractive index n of the material of which the data carrier is made ($n = 1.56$ in the case of polyvinylchloride). To maintain this effect unchanged, the invention provides for the protective layer to adhere to the impression only at the peaks in the relief thereof. Thus, in each trough or hollow of the impression, there is an elementary volume of highly diffractive nature whose refractive index is equal to unity.

In FIG. 2, there can be seen in cross-section a data carrier protected in accordance with the invention. The adhesion between the impression-carrying data carrier 17 and protective layer 16 is ensured by a transparent under-layer 18 which has self-adhesive properties. More precisely, this is an underlayer of a plasticised and consequent sticky material the thickness of which may range between one and several hundred angstrom units. The thickness of this underlayer will preferably be chosen to be less than the depth of the diffractive elements 14, which is in the order of one micron. This avoids the possibility that as a consequence of a flow mechanism occurring under pressure, the material could block up the hollows in the impression.

By way of non-limitative example, with a data carrier 17 of polyvinylchloride, 200 microns in thickness, it is possible to use a protective layer of polyethyleneterephtalate 100 microns in thickness. This protective layer is chosen by reason of its good transparency, its flexibility and its excellent mechanical resistance in particular to abrasion. To achieve adhesion between the peaks of the impression carried by the data carrier 17, and the protective layer 16, the latter is given a sticky action by depositing upon it the plasticised under-layer 18. It is possible for example to use as under-layer a film of polyvinylchloride and polyvinylacetate into which there has been incorporated a plasticiser, for example butyl phtalate or octyl phthalate.

In order to deposit a very thin self-adhesive film, the various ingredients may be placed in solution in an appropriate solvent. The protective layer 16 is coated by means of this solution, utilising the roller coating device in FIG. 5 or the centrifugal coating device shown in FIG. 6.

In the case of FIG. 5, the coating is produced by rolling the protective layer 16 over a cylinder 21 partially immersed in the solution 23 and pivoting about a shaft attached to the vessel 22.

In the case of the FIG. 6, the protective layer 16 is cut in the form of a disc and attached to the turntable 24 of a centrifuge. A dose of the solution 23, applied at the position of the axis of rotation 25, is then disposed extremely uniformly under the effect of the centrifugal acceleration.

In either case, after evaporation of the solvent, the protective coating layer can be applied against the relief impression in the data carrier 17. Self-evidently, these coating methods are in no way limitative of the scope of the invention and it is equally possible to use a process of dipping the protective layer in the solution, followed by withdrawal at constant rate. This leads to a coating on both faces of the protective layer and it is necessary then to provide at one side thereof, the data carrier 17 and at the other side thereof, another, non-plasticised protective layer. The adhesion achieved with a self-adhesive under-layer may be inadequate at the centre and periphery of the disc. To prevent the protective layer from curling up near the edges of the data carrier, it is possible to use a thermo-welding technique to form beads which reinforce the connection between the protective layer and the data carrier. These beads are of course located outside the engraved areas of the data carrier.

The self-adhesion technique described hitherto, is not the only one possible.

In FIG. 3, there have been illustrated in section a data carrier and a protective layer 16 which adheres to the peaks in the relief of the impression 14, through the zones at which autogenous welding is being carried out and which are cross-hatched obliquely in the figure. To effect this welding operation, for example a protective layer 16 of polyvinylchloride is used, a very thin superficial section 19 of which is dissolved using appropriate solvents such as: methyl ethyl ketone, cyclohexanone, cyclopentanone or methyl isobutyl ketone. The application of the solvent can be performed in a coating operation utilising the devices shown in FIGS. 5 and 6, in order to dissolve a section whose thickness is between one and some few hundred angstrom units. It is then merely necessary to apply that face of the protective layer which has been wetted by the solvent, against the impression carried by the data carrier 17, in order to produce an autogenous weld. The thickness of the dissolved section is small compared with the depth of the troughs 14 and the impression so that the latter do not become blocked.

In order to produce a strong weld, it is preferable for the solvent used to be capable of dissolving the materials not only of the protective layer 16 but also of the data carrier 17. It is a good idea, furthermore, to use the same material at both sides of the weld.

Without departing from the scope of the present invention, it is equally possible to have recourse to assembly by a sticking operation, as illustrated by the section of FIG. 4. In this eventuality, the protective layer 16 is coated with a thin film of adhesive 20 whose thickness may for example range between 500 and 1000 angstrom units. The adhesive used may consist of a solution of polyvinylchlorite and polyvinylacetate in proportions of 85-15, using methylethylketone as the solvent. The devices of FIGS. 5 and 6 are again suitable for the coating operation carried out on the protective layer 16 in this context. The elimination of microscopic air bubbles which may occur, is achieved by applying a moderate pressure to the protective layer when in position over the impression 14 in the data carrier 17.

As another variant embodiment, it is conceivable again to apply the protective layer 16 to the impression 14 after the latter has been coated with an adhesive film having a viscosity such that it spreads over the peaks of the impression without penetrating into the troughs thereof.

The device which can be used to spread such a film, is that illustrated in FIG. 5.

This latter process enables the impression to be coated directly but has the drawback of being difficult to use owing to the difficulty of controlling the viscosity of the film. Moreover, as the film lacks rigidity it leaves air bubbles if the operation is not carried in a vacuum chamber.

An object of the invention is to provide a support having a final structure similar to that disclosed above but obtained by a process which directly treats the impression and does not have the aforementioned drawbacks.

FIG. 7 shows an information support comprising a sheet 17 of a thermoplastic material transparent to the reading radiation on which an impression in relief 1 has been engraved. This impression is formed by depressions of varying length arranged on a spiral having a substantially constant pitch. By way of example, this impression may have a depth of 3,000 A for a reading radiation having a wavelength of 6,328 A. The length of the apertures and the spacing therebetween vary between a few tenths and a few $\mu$m. These depressions have a flat bottom and steep lateral walls. This impression is engraved by a pressing operation on the thermoplastic sheet which may be, by way of a non-limitative example, a film of polyvinyl chloride, a film of ethylene polyterephthalate covered with a layer of polyvinyl or a film of amorphous ethyl polyterephthalate.

The protecting layer adhering to the peaks of the impression is obtained by a process which may be divided into three steps.

In a first step, a sub-layer 20 shown in FIG. 7 is deposited on the face of the transparent sheet carrying the impression.

For this purpose, the sheet is dipped into a filtered solution of ether and cellulose nitrate then withdrawn from this solution at a constant speed. The thickness of the sub-layer thus deposited is substantially constant and depends on the dilution of the solution and on the speed at which the sheet is withdrawn from the solution. By way of example, a 4% solution and a speed of withdrawal of 3m/min results in a sub-layer having a thickness in the neighbourhood of 2 $\mu$m whose outer face substantially reproduces an attenuated relief of the impression.

In this first stage the sub-layer fills the troughs of the impression. As the solution was previously filtered, the sub-layer obtained contains neither dust nor aggregates.

In a second stage, the coated sheet is subjected to a rapid drying which causes the evaporation of the ether contained in the fluid sub-layer. As the temperature of boiling of the ether is in the neighbourhood of room temperature, 34.6° C, the ether is rapidly volatilised. As cellulose nitrate has characteristics of elasticity, the sub-layer in loosing the solvent, becomes tensioned and detaches itself from the troughs 14 of the impression. Its outer face tends to become planar and the penetration into the troughs is reduced to a thickness of between 800 and 1,000 A. The unfilled space is sufficient to obtain, upon reading, a diffracting action which is substantially that of the uncovered impression.

Figure 8:
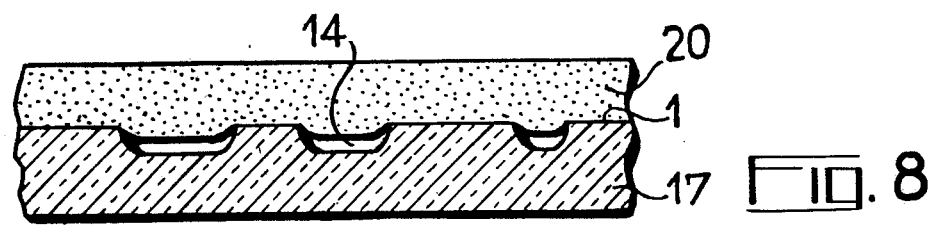

The sheet covered with the sub-layer of cellulose nitrate in the state shown in FIG. 8 is thereafter subjected to a slow drying for a few hours. Experience shows that the outer face of the sub-layer thus obtained is substantially planar. This sub-layer 20 therefore performs an optical function for the conservation and use of the information. However, it is sufficient to ensure an effective mechanical protection of the support.

Figure 9:
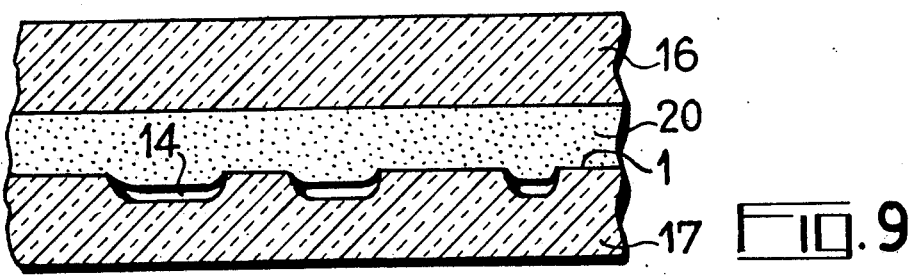

In a third step, a complementary protecting layer 16 is deposited on the outer face of the sub-layer of cellulose nitrate as shown in FIG. 9.

This complementary layer must be transparent to the reading radiation and of sufficient thickness to ensure that the scratches, soiling and dust harming its outer surface does not disturb the optical radiation in the region of the reading spot. This layer must be sturdy and capable of being cleaned.

This layer may be obtained for example from a liquid solution whose solvent does not attack the sub-layer, that is in the present case the sub-layer of cellulose nitrate, and deposited by printing, coating, centrifuging or spraying. It must be understood that this list of possible processes is not intended to be limitative.

This layer may also be an adhesive film or a film rendered adhesive by a partial dissolving of the surface adapted to adhere to the sub-layer. The adhesion may be achieved by pressing or by the passage of the disc to be protected and of the adhesive film between two rollers, this method enabling the inclusion of bubbles between the two layers to be avoided.

This complementary layer may also be obtained by depositing by polymerization a material in a gaseous phase on the surface of the sub-layer of cellulose nitrate.

In the envisaged application, the disc being engraved with an impression of depth 3,000 A, the cellulose nitrate sub-layer may have a thickness of between 2 and 5 $\mu$m, the complementary layer having a thickness of a few tens of $\mu$m.

It is possible to envisage in a fourth stage the deposit, on the surface of the complementary layer, of a very hard thin layer should the hardness of this complementary layer be insufficient.

The invention is not intended to be limited, for obtaining a sub-layer which, after drying, no longer adheres to the bottom of the apertures of the impression, to the use of cellulose nitrate dissolved in ether.

Other transparent materials may be employed, but they must be able to be dissolved in a very volatile solvent, if possible at a temperature in the neighbourhood of room temperature, such as the ether in the process described hereinbefore. Further, the solvent must not attack the material of the impression-carrying sheet. Lastly, in order that in the course of drying the sub-layer be suitably detached from the troughs, the material employed must have a certain elasticity so that its tensioning occurs without crackling of the sub-layer.

If the solvent employed is volatile at a temperature substantially higher than room temperature, the transparent sheet covered with the fluid solution must be dried in a vessel brought to a temperature which is such that the solvent is volatilised and the sub-layer is detached from the hollows of the impression.

The materials having these various features and the suitable solvent may be employed when carrying out the protecting process according to the invention for obtaining an information support protected by a sub-layer which does not adhere to the hollows of the impression.

What we claim is:

1. A data carrier optically readable by transmission using an optical radiation, said data carrier comprising: a sheet of material transmitting said radiation; said sheet having at least one face carrying a permanent relief impression; said relief impression being in the form of a track; said track being made up of a succession of diffractive elements formed by alternating peaks and troughs constituting the transcription of a carrier wave angularly modulated by said data; said data carrier further comprising at least one protective layer transmitting said radiation; said protective layer having smooth faces and adhering by one of said smooth faces to said peaks without filling up said troughs; the bottom of said troughs being in contact with a space having a refractive index substantially equal to unity.

2. A data carrier as claimed in claim 1, wherein said diffractive elements are constituted by depressions in the engraved face of said data carrier; said protective layer adhering to those portions of said engraved face at which no depressions occur.

3. A data carrier as claimed in claim 1, wherein said diffractive elements are constituted by elevations on the engraved face of said data carrier; said protective layer adhering to the tips of said elevations.

4. A data carrier as claimed in claim 1, wherein said protective layer adheres to the peaks of said relief, by welding; said welding being produced by dissolving a superficial section of said protective layer; said section having a thickness less than the depth of said relief.

5. A data carrier as claimed in any of claim 1, wherein the adhesion of said protective layer is achieved by means of an under-layer transmitting said radiation and having a thickness smaller than the depth of said relief.

6. A data carrier as claimed in claim 5, wherein said under-layer is a self-adhesive under-layer constituted by a film of plasticised material.

7. A data carrier as claimed in claim 5, wherein said under-layer is constituted by an adhesive material.

8. A data carrier as claimed in claim 1, wherein said data carrier is a disc.

9. A data carrier as claimed in claim 1, wherein said data carrier and said protective layer form a flexible structure.

10. A data carrier as claimed in claim 1, wherein the adhesion of said protective layer to said data carrier is supplemented by the formation of weld beads located outside the engraved areas of said data carrier.

11. A data carrier as claimed in claim 1, wherein said protective layer comprises an underlayer transmitting said radiation; said underlayer adhering to said relief impression along said peaks; said protective layer comprising a complementary layer transmitting said radiation and deposited on said underlayer.

12. A data carrier as claimed in claim 11, wherein said complementary layer has a thickness substantially greater than the depth of said relief impression; said complementary layer being overlayed with a thin film of hard material transmitting said radiation.

13. A data carrier as claimed in claim 12, wherein said underlayer is made of cellulose nitrate.

14. A method of manufacturing a data carrier optically readable by transmission using an optical radiation, said method comprising the steps of: forming on at least one face of a sheet of material transmitting said radiation a permanent relief impression; said relief impression being in the form of a track made up of a succession of alternating peaks and troughs constituting the transcription of a carrier wave angularly modulated by said data; and causing a protective layer transmitting said optical radiation and having smooth faces to adhere to said peaks without filling up said troughs; the bottom of said troughs being in contact with a space having a refractive index substantially equal to unity.

15. A method of manufacture as claimed in claim 14, wherein the adhesion of said protective layer is provided in accordance with the process of welding by dissolution.

16. A method as claimed in claim 14, wherein the adhesion of said protective layer is provided in accordance with a process comprising the step of spreading an adhesive material upon said protective layer in the form of a thin film.

17. A method of manufacture as claimed in claim 16, wherein said process is carried out with a device performing a liquid-phase coating.

18. A method of manufacturing a data carrier optically readable by transmission using an optical radiation, said method comprising the steps of:

forming on at least one face of a sheet of material transmitting said radiation a permanent relief impression; said relief impression being in the form of a track made up of a succession of alternating peaks and troughs constituting the transcription of a carrier wave angularly modulated by said data;

dipping said sheet in a filtered solution containing a second material transmitting said radiation and a very volatile solvent of said second material, and withdrawing said sheet from said solution at a constant speed;

subjecting said sheet to a drying in a dust-free atmosphere producing the rapid evaporation of said solvent so as to form a sub-layer on said relief impression;

and, depositing a complementary layer on said sub-layer.

19. A method as claimed in claim 18, wherein said second material is cellulose nitrate and said solvent is ether.

20. A method of manufacture as claimed in claim 16, wherein said process is a process of sticking.

21. A method of manufacture as claimed in claim 16, wherein said process is a process of self-adhesion.

* * * * *